Feb. 23, 1932.  J. P. BREUER  1,847,054
CUTTER
Filed May 2, 1929
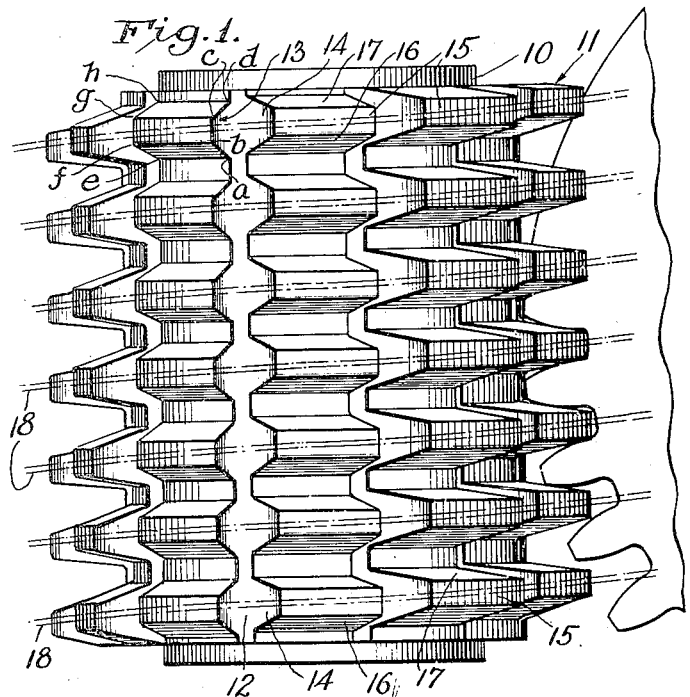
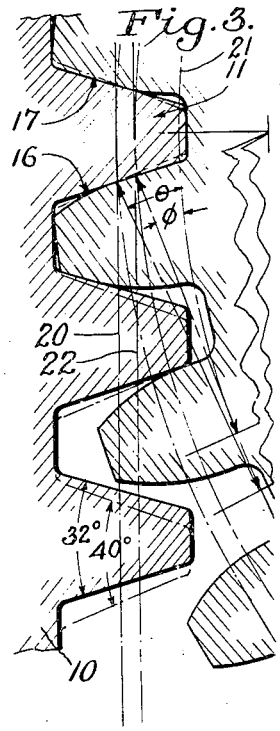
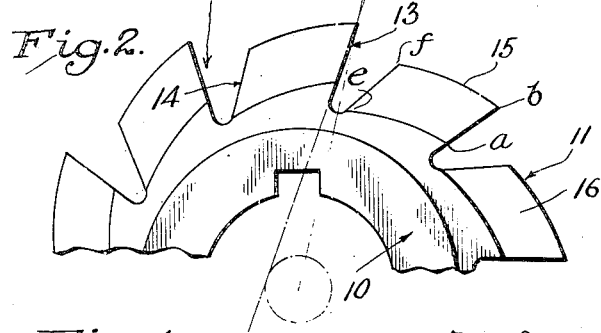
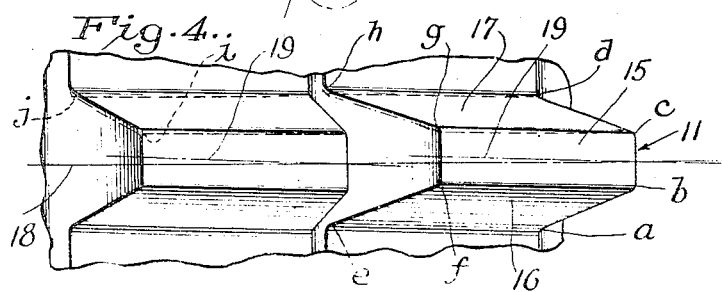
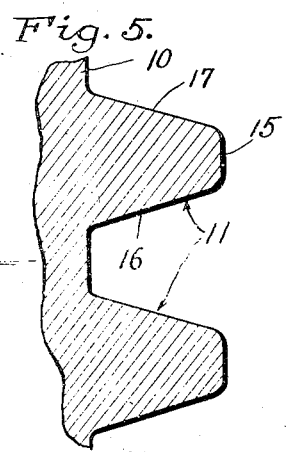
INVENTOR
John P. Breuer
BY
ATTORNEYS Patented Feb. 23, 1932

1,847,054

UNITED STATES PATENT OFFICE

JOHN P. BREUER, OF ROCKFORD, ILLINOIS, ASSIGNOR TO BARBER-COLEMAN COMPANY, OF ROCKFORD, ILLINOIS, A CORPORATION OF ILLINOIS

CUTTER

Application filed May 2, 1929. Serial No. 359,726.

The present invention relates generally to improvements in rotary cutters, and particularly gear cutting hobs.

The general objects of the present invention reside in the provision of a new and improved hob which has a higher cutting efficiency, a greater cutting clearance, a longer life, and distribution of wear over a larger surface than hobs provided heretofore.

Another object resides in the provision of a novel hob in which the teeth are inclined laterally about the radial center of the face out of the thread helix to provide an additional clearance on one side, and in which material is removed from the teeth to provide the necessary clearance on the other side.

A more specific object resides in the provision of a hob of the foregoing character in which an additional top relief is provided to compensate for the additional side clearances so that the faces of the teeth can be resharpened without altering the effective cutting contour.

An important object resides in the provision of a novel hob in which the teeth are inclined laterally so as to shorten the lead of each individual tooth, and in which the teeth also have a reduced pressure angle.

Another object is to provide a hob of the foregoing character in which the upper side edges of the teeth are rounded.

Further objects and advantages will become apparent as the description proceeds.

In the accompanying drawings, Figure 1 is an elevational view of a hob having a single right hand thread embodying the features of my invention.

Figure 2 is a fragmentary end elevational view of the hob.

Figure 3 is a diagrammatic view in cross section showing a portion of the hob in cutting engagement with a portion of the gear blank.

Figure 4 is a fragmentary plan view of two successive hob teeth.

Figure 5 is a transverse sectional view of two laterally adjacent hob teeth.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the hob constituting the exemplary embodiment of the invention comprises a body 10 adapted to be mounted on a supporting arbor (not shown). The peripheral surface of the body is formed with a plurality of hob teeth 11. In common hob practice, the hob teeth may be arranged in one or more right hand or left hand helical threads interrupted by generally longitudinal straight or inclined gashes. In the present instance, I have shown the teeth 11 generally arranged in a single right hand helical thread intersected by a plurality of straight longitudinal gashes 12, although it is to be understood that in its broadest concept, the invention is not limited to such construction.

Each tooth 11 has a front face 13 defining a cutting contour $a$—$b$—$c$—$d$, a back 14 defined by a margin $e$—$f$—$g$—$h$, a top 15 defined by a margin $b$—$c$—$f$—$g$, a drag side 16 defined by a margin $a$—$b$—$e$—$f$, and a shear side 17 defined by a margin $c$—$d$—$g$—$h$.

It is common practice to arrange the hob teeth throughout their length in a true helical thread having a lead corresponding to the normal circular pitch of the gear to be hobbed, and to provide the teeth with a uniform eccentric relief. The thread helix is represented by dotted lines 18 in Figs. 1 and 4. I have observed that wear on the teeth first becomes pronounced on the entering side (shear side 17) of the cutting contour $a$—$b$—$c$—$d$ near the top, next on the outer corners $b$ and $c$, and then on the leaving side (drag side 16) near the top. Thus, the top of the cutting contour $b$—$c$, although it is relatively small in extent, does most of the cutting and is subjected to most of the wear.

The first wear is caused by rubbing on the sides of the teeth. This increases the temperature, thereby substantially reducing the resistance to wear of the cutting face. To avoid excessive wear on the sides of the teeth 11, and incidentally to decrease the driving power required and to increase the rate of production, I provide additional side clearance. This clearance may be provided on either or both sides of the teeth, and may be formed in any suitable manner. In the present instance, I tilt each tooth 11, about the radial center line of the front face 13, out of the hob helix. Preferably the tooth 11 is tilted to the right as viewed from the front face, i. e., is tilted toward the shear side 17, thereby providing clearance on the drag side 16. The direction of the tilted teeth is represented in Fig. 4 by the lines 19. Side clearance is then cut on the shear side to bring same within the limits of tolerance, and preferably still more to increase the clearance. To this end, the material is removed to the plane $c$—$d$—$i$—$j$ (see Fig. 4). As a result of the additional side clearances, a sharply defined cutting contour is produced, and the cutting efficiency is greatly increased. No excessive rubbing and wearing takes place on the sides of the teeth.

Providing additional side clearance tends to decrease the width of the teeth from front to rear. This usually is immaterial in a roughing hob. In a finishing hob, it is desirable to provide a tooth form which will retain a predetermined cutting contour upon resharpening, and hence to compensate for the additional side clearance, an additional top clearance is provided. This top clearance is in excess of the normal eccentric relief, and is such that the width of the top from front to rear is uniform.

Most of the cutting in a hobbing operation is done by the outer end of the tooth. Yet this part of the tooth is relatively small in effective area, and hence most subject to wear. An important feature of the present invention resides in the provision of a hob in which the teeth are not only inclined out of the thread helix and provided with additional side clearance, but in which also the face of each tooth is wider at and near the top than heretofore so that heat and wear will be distributed over a wider area. This is accomplished by shortening the lead of the hob. As a result, the pressure angle of the hob is reduced. Heretofore, the hob and the gear being hobbed have had the same pressure angle, for example 20°, indicated at $\theta$ in Fig. 3. The present hob has a pressure angle less than that of the gear to be hobbed, for example 16°, indicated at $\phi$ in Fig. 3. The change in pressure angle results in a more vertical disposition of the sides 16 and 17 of the teeth, thereby widening the top $b$—$c$ and narrowing the root $a$—$d$ of each tooth. The new form will however generate the same form of gear tooth since the generating action will compensate for the change.

Referring to Fig. 3, the form of prior standard hob teeth has been superimposed in dotted outline on the teeth with the reduced pressure angle. By way of comparison, it will be noted that the sides of the teeth 11 with the reduced pressure angle are more nearly perpendicular to the body of the cutter and include or define a smaller angle than the sides of the standard teeth. By way of illustration, the former may include an angle of 32°, whereas the latter may include an angle of 40°. As a result, the teeth 11 are narrower at the base and wider at the ends than the standard teeth, thereby increasing the area most exposed to wear. The gear pitch line is represented by the line 20. The hob pitch line does not coincide with the line 20, but falls between the line 20 and the base circle 21, and is represented by the line 22. The pressure angle $\phi$ of the teeth 11 is substantially less than the pressure angle $\theta$ of the standard teeth.

In finishing hobs, the top edges $b$—$f$ and $c$—$g$ of the teeth 11 are quite sharply defined, but preferably are slightly rounded, for example on a radius of one-tenth of the thickness of the tooth measured at the pitch line. In roughing hobs, the top edges of the teeth 11 are rounded very substantially as illustrated in Fig. 5.

I claim as my invention:

1. A hob having a plurality of cutting teeth arranged in a peripheral helical thread, said teeth having a reduced pressure angle, each of said teeth being laterally inclined out of the thread helix about the medial line of the front face.

2. A hob having a plurality of cutting teeth arranged in a peripheral helical thread, each of said teeth being laterally inclined out of the thread helix about the medial line of the front face to provide a substantial cutting clearance on one side, having a cutting clearance on the other side sufficient to compensate for the inclination, and having a top relief sufficient to produce a top surface uniform in width throughout its length.

3. A hob having a plurality of cutting teeth arranged in a peripheral helical thread, said teeth having a reduced pressure angle, each of said teeth being laterally inclined out of the thread helix toward the shear side about the medial line of the front face to provide a substantial cutting clearance on the drag side, and having a cutting clearance on the shear side sufficient in magnitude to compensate for the inclination.

4. A hob having a plurality of cutting teeth arranged in a peripheral helical thread, said teeth having a reduced pressure angle each of said teeth being laterally inclined out of the thread helix toward the shear side about the medial line of the front face to provide a substantial cutting clearance on the drag side, having a cutting clearance on the shear side sufficient in magnitude to compensate for the inclination, and having a top relief sufficient in magnitude to produce a top surface uniform in width throughout its length.

5. A hob having a plurality of cutting teeth arranged in a peripheral helical thread, said teeth having a reduced pressure angle, each of said teeth being laterally inclined out of the thread helix about the medial line of the front face, the side edges of the top being rounded.

6. A hob having a plurality of cutting teeth arranged in a peripheral helical thread, said teeth having a reduced pressure angle, each of said teeth being laterally inclined out of the thread helix toward the shear side about the medial line of the front face to provide a substantial cutting clearance on the drag side, having a cutting clearance on the shear side sufficient in magnitude to compensate for the inclination, and having a top relief sufficient in magnitude to produce a top surface uniform in width throughout its length, the side edges of the top being rounded.

In testimony whereof, I have hereunto affixed my signature.

JOHN P. BREUER.